(12) United States Patent
Goto

(10) Patent No.: US 10,302,029 B2
(45) Date of Patent: May 28, 2019

(54) CONTROL APPARATUS FOR INTERNAL COMBUSTION ENGINE SUPPRESSING WHITE SMOKE EMISSIONS

(71) Applicant: TOYOTA JIDOSHA KABUSHIKI KAISHA, Toyota-shi, Aichi-ken (JP)

(72) Inventor: Isamu Goto, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 256 days.

(21) Appl. No.: 15/122,468

(22) PCT Filed: Feb. 27, 2015

(86) PCT No.: PCT/IB2015/000249
§ 371 (c)(1),
(2) Date: Aug. 30, 2016

(87) PCT Pub. No.: WO2015/132644
PCT Pub. Date: Sep. 11, 2015

(65) Prior Publication Data
US 2017/0074181 A1    Mar. 16, 2017

(30) Foreign Application Priority Data
Mar. 5, 2014 (JP) ................. 2014-043206

(51) Int. Cl.
*F02D 41/00* (2006.01)
*F01N 3/00* (2006.01)
(Continued)

(52) U.S. Cl.
CPC ......... *F02D 41/0007* (2013.01); *F01N 3/025* (2013.01); *F01N 3/085* (2013.01);
(Continued)

(58) Field of Classification Search
CPC ............ F02D 41/0007; F02D 41/0055; F02D 41/0077; F02D 41/0235; F02D 41/1446;
(Continued)

(56) References Cited

U.S. PATENT DOCUMENTS

| | | | |
|---|---|---|---|
| 7,757,678 B2 * | 7/2010 | Marsh ................... | F02M 26/05 123/568.12 |
| 7,798,134 B2 * | 9/2010 | Marsh ................... | F02M 26/24 123/568.12 |

(Continued)

FOREIGN PATENT DOCUMENTS

| | | |
|---|---|---|
| CN | 102322318 A | 1/2012 |
| CN | 102787892 A | 11/2012 |

(Continued)

*Primary Examiner* — Thai Ba Trieu
(74) *Attorney, Agent, or Firm* — Finnegan, Henderson, Farabow, Garrett & Dunner, LLP

(57) ABSTRACT

A control apparatus for an internal combustion engine is provided. The control apparatus includes a temperature sensor and an electronic control unit. The temperature sensor is configured to detect the temperature of an exhaust gas control apparatus. The electronic control unit is configured to: estimate a sulfuric compound accumulation amount on the exhaust gas control apparatus; and when a specific condition in which the sulfuric compound accumulation amount is equal to or larger than a predetermined accumulation amount and the temperature of the exhaust gas control apparatus is equal to or higher than a predetermined temperature or more is satisfied, control an intake air amount adjuster such that an intake air amount when the specific condition is satisfied is increased as compared to the intake air amount when the specific condition is not satisfied in the same operation state.

5 Claims, 4 Drawing Sheets

(51) Int. Cl.

| | | |
|---|---|---|
| *F01N 3/10* | (2006.01) | |
| *F02D 41/02* | (2006.01) | |
| *F01N 9/00* | (2006.01) | |
| *F02D 41/14* | (2006.01) | |
| *F02D 11/10* | (2006.01) | |
| *F01N 3/08* | (2006.01) | |
| *F02B 37/22* | (2006.01) | |
| *F01N 3/025* | (2006.01) | |
| *F02B 37/24* | (2006.01) | |
| *F02D 9/08* | (2006.01) | |

(52) U.S. Cl.
CPC ............. *F01N 9/002* (2013.01); *F02B 37/22* (2013.01); *F02B 37/24* (2013.01); *F02D 9/08* (2013.01); *F02D 11/105* (2013.01); *F02D 41/0055* (2013.01); *F02D 41/0077* (2013.01); *F02D 41/0235* (2013.01); *F02D 41/1446* (2013.01); *F02D 41/1467* (2013.01); *F01N 3/103* (2013.01); *F01N 2560/027* (2013.01); *F01N 2560/06* (2013.01); *F01N 2560/20* (2013.01); *F01N 2610/03* (2013.01); *F01N 2900/0416* (2013.01); *F01N 2900/1612* (2013.01); *F02D 41/029* (2013.01); *F02D 2011/102* (2013.01); *F02D 2200/02* (2013.01); *F02D 2200/0611* (2013.01); *F02D 2200/0802* (2013.01); *F02D 2200/0818* (2013.01); *F02D 2200/101* (2013.01); *F02D 2250/38* (2013.01); *Y02T 10/144* (2013.01); *Y02T 10/47* (2013.01)

(58) Field of Classification Search
CPC ...... F02D 41/1467; F02D 41/029; F02D 9/08; F02D 11/105; F02D 2011/102; F02D 2200/02; F02D 2200/0611; F02D 2200/0802; F02D 2200/0818; F02D 2200/101; F02D 2250/38; F01N 3/025; F01N 3/085; F01N 9/002; F01N 3/103; F01N 2560/027; F01N 2560/06; F01N 2560/20; F01N 2610/03; F01N 2900/0416; F01N 2900/1612; Y02T 10/144; Y02T 10/47; F02B 37/22; F02B 37/24
USPC .................................. 60/602, 280, 282, 611
See application file for complete search history.

(56) References Cited

U.S. PATENT DOCUMENTS

| 8,276,366 | B2 * | 10/2012 | Bennet | F01N 3/021 |
| | | | | 60/280 |
| 8,312,708 | B2 * | 11/2012 | Bennet | F01N 3/035 |
| | | | | 60/280 |
| 8,826,730 | B2 * | 9/2014 | Koizumi | F01N 3/103 |
| | | | | 73/114.76 |
| 2005/0109014 | A1 | 5/2005 | Hayashi | |
| 2008/0163855 | A1 * | 7/2008 | Matthews | F02M 26/25 |
| | | | | 60/605.2 |
| 2012/0291628 | A1 | 11/2012 | Seo et al. | |
| 2016/0108844 | A1 * | 4/2016 | Nishioka | F01N 3/2066 |
| | | | | 60/285 |
| 2017/0009695 | A1 * | 1/2017 | Hashida | F02D 41/1456 |
| 2017/0248058 | A1 * | 8/2017 | Goto | F02D 41/029 |

FOREIGN PATENT DOCUMENTS

| JP | 7-247916 | | 9/1995 | | |
| JP | 2002-155737 | A | 5/2002 | | |
| JP | 2004-245046 | | 9/2004 | | |
| JP | 2005-133562 | A | 5/2005 | | |
| JP | 2010-229916 | | 10/2010 | | |
| JP | 2011-132836 | | 7/2011 | | |
| JP | 2015-169105 | | 9/2015 | | |
| JP | 2017156133 | A * | 9/2017 | ......... | F02D 19/0657 |
| WO | WO-2014007749 | A1 * | 1/2014 | ........... | F01N 3/0885 |
| WO | WO 2015/132646 | A1 | 9/2015 | | |

* cited by examiner

CONTROL APPARATUS FOR INTERNAL COMBUSTION ENGINE SUPPRESSING WHITE SMOKE EMISSIONS

CROSS-REFERENCE TO RELATED APPLICATIONS

This application is a national phase application of International Application No. PCT/IB2015/000249, filed Feb. 27, 2015, and claims the priority of Japanese Application No. 2014-043206 filed on Mar. 5, 2014, the content of both of which is incorporated herein by reference.

BACKGROUND OF THE INVENTION

1. Field of the Invention

The invention relates to a control apparatus for an internal combustion engine.

2. Description of Related Art

In some cases, a sulfuric compound in an exhaust gas may be accumulated on an exhaust gas control apparatus such as a catalyst. Japanese Patent Application Publication No. 2010-229916 (JP 2010-229916 A) discloses a sulfur poisoning regeneration control that separates sulfur accumulated on a catalyst. Further, Japanese Patent Application Publication No. 7-247916 (JP 7-247916 A), Japanese Patent Application Publication No. 2004-245046 (JP 2004-245046 A), and Japanese Patent Application Publication No. 2011-132836 (JP 2011-132836 A) also disclose techniques for regenerating a catalyst.

SUMMARY OF THE INVENTION

When an accumulated sulfuric compound is separated from an exhaust gas control apparatus, an exhaust gas may be visibly recognized as white smoke. When such white smoke is visibly recognized, for example, a user may feel anxious.

The invention provides a control apparatus for an internal combustion engine in which white smoke is not easily and visibly recognized.

According to an aspect of the invention, there is provided a control apparatus for an internal combustion engine, the internal combustion engine including an exhaust gas control apparatus provided in an exhaust system of the internal combustion engine and an intake air amount adjuster adjusting an intake air amount with respect to the internal combustion engine. The control apparatus includes a temperature sensor and an electronic control unit. The temperature sensor is configured to detect the temperature of the exhaust gas control apparatus. The electronic control unit is configured to: (a) estimate a sulfuric compound accumulation amount, the sulfuric compound accumulation amount being an amount of a sulfuric compound accumulated on the exhaust control apparatus; and (b) when a specific condition in which the sulfuric compound accumulation amount is equal to or larger than a predetermined accumulation amount and the temperature of the exhaust gas control apparatus is equal to or higher than a predetermined temperature or more is satisfied, control the intake air amount adjuster such that the intake air amount when the specific condition is satisfied is increased as compared to the intake air amount when the specific condition is not satisfied in the same operation state. The electronic control unit may be configured to, when the specific condition is satisfied and the operation state of the internal combustion engine is in a predetermined region, control the intake air amount adjuster such that the intake air amount when the specific condition is satisfied is increased as compared to the intake air amount when the specific condition is not satisfied in the same operation state. The electronic control unit may be configured to, when the specific condition is satisfied and the operation state of the internal combustion engine is in a high load side region or a high rotation speed side region compared to the predetermined region, control the intake amount such that the intake air amount when the specific condition is satisfied is not increased as compared to the intake air amount when the specific condition is not satisfied in the same operation state.

The air intake amount adjuster may be at least one of a throttle valve, an exhaust gas recirculation valve, and a variable nozzle vane of an exhaust turbine of a turbocharger, and an intake air amount increase control may employ at least one of a control of controlling the throttle valve to an opening side, a control of controlling the exhaust gas recirculation valve to a closing side, and a control of controlling the variable nozzle vane to a closing side.

It is possible to provide the control apparatus for the internal combustion engine in which white smoke is not easily and visibly recognized.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
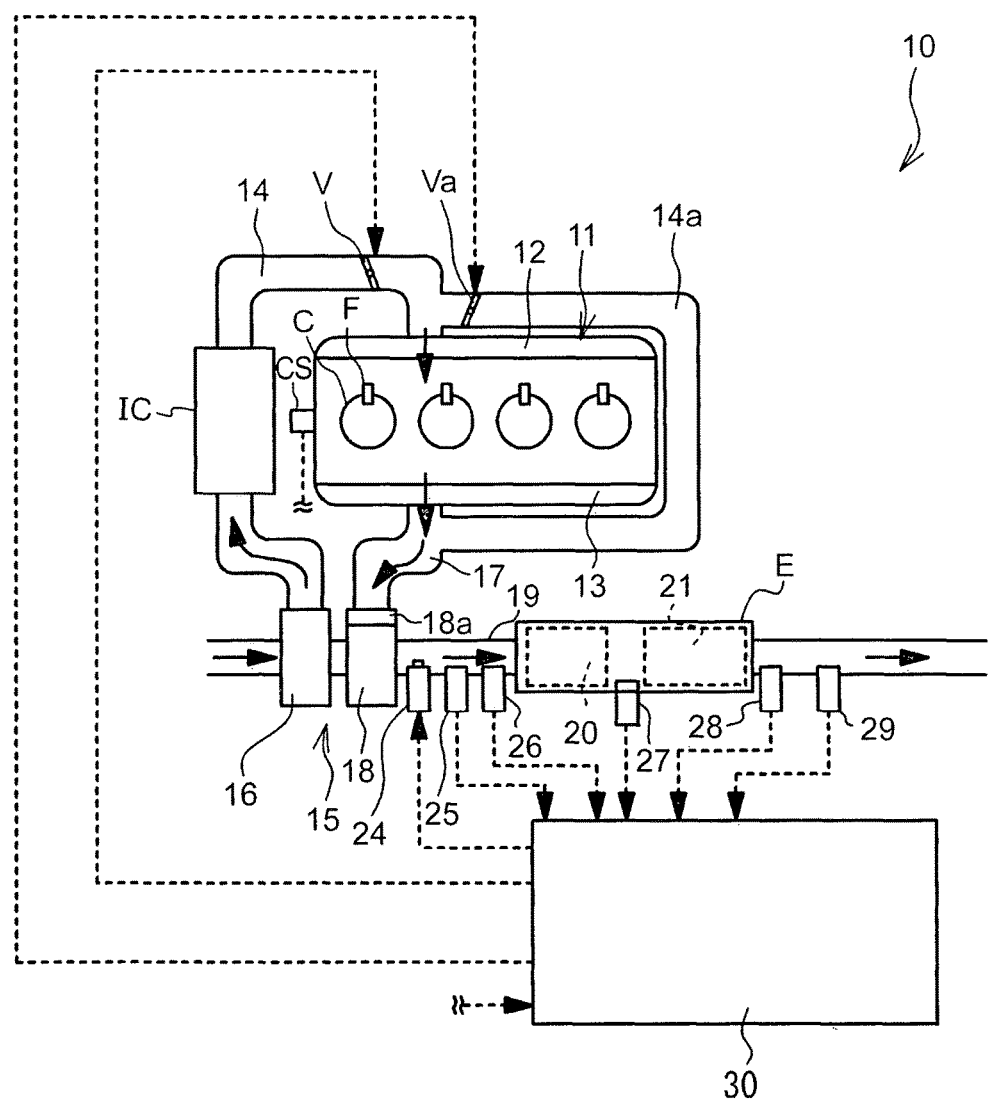
FIG. 1 is a diagram illustrating an engine system of an embodiment.

FIG. 1 is a diagram illustrating an engine system 10 according to an embodiment. A diesel engine (hereinafter, referred to as an engine) 11 includes an intake manifold 12 and an exhaust manifold 13. The intake manifold 12 is connected to an outlet of a compressor 16 of a turbocharger 15 through an intake passageway 14. The intake passageway 14 is equipped with an intercooler IC that cools intake air and a throttle valve V that adjusts an air intake amount with respect to the engine 11. The exhaust manifold 13 is connected to an inlet of an exhaust turbine 18 of the turbocharger 15 through an exhaust passageway 17. A variable nozzle vane 18a is provided at the inlet of the exhaust turbine 18. The flow rate of the exhaust gas that passes through the exhaust turbine 18 may be adjusted in response to the opening degree of the variable nozzle vane 18a. The outlet of the exhaust turbine 18 is connected to an exhaust passageway 19. The exhaust gas that is generated from the engine 11 is discharged to the exhaust passageway 19 through the exhaust turbine 18. The engine 11 includes four cylinders C and four fuel injection valves F that directly and respectively inject fuel into the four cylinders C, but the invention is not limited thereto. An EGR (Exhaust Gas Recirculation) passageway 14a is connected between the intake passageway 14 and the exhaust passageway 17. The EGR passageway 14a is equipped with an EGR valve Va. The engine 11 is equipped with a crank angle sensor CS that detects the engine rotation speed.

The exhaust passageway 19 is equipped with an exhaust gas control apparatus E that purifies an exhaust gas. A DOC (Diesel Oxidation Catalyst) 20 and a DPF (Diesel Particulate Filter) 21 are provided inside the exhaust gas control apparatus E in order from the upstream side to the downstream side. The DOC 20 is an oxidation catalyst that oxidizes HC and NO contained in the exhaust gas so as to be converted into $H_2O$ and $CO_2$. The DPF 21 traps a particulate matter contained in the exhaust gas. The exhaust gas control apparatus E is an example of the exhaust gas control apparatus.

A fuel adding valve 24, a SOx sensor 25, and a temperature sensor 26 are provided in the exhaust passageway 19 between the exhaust turbine 18 and the DOC 20. The SOx sensor 25 detects a sulfur concentration in the exhaust gas flowing through the DOC 20. Furthermore, a fuel property sensor may be provided in a fuel tank instead of the SOx sensor 25 so as to directly detect the sulfur concentration in fuel. The fuel adding valve 24 adds fuel used to burn the PM (Particulate Matter) accumulated on the DPF 21 into the exhaust gas. The temperature sensor 26 detects the temperature of the exhaust gas flowing into the DOC 20.

A temperature sensor 27 is provided in the exhaust passageway 19 between the DOC 20 and the DPF 21. The temperature sensor 27 detects the temperature of the exhaust gas which passes through the DOC 20 and flows into the DPF 21. A temperature sensor 28 and an air-fuel ratio sensor 29 are provided in the exhaust passageway 19 at the downstream side of the DPF 21. The temperature sensor 28 detects the temperature of the exhaust gas passing through the DPF 21. The air-fuel ratio sensor 29 detects the air-fuel ratio of the exhaust gas that passes through the DPF 21.

An ECU (Electronic Control Unit) 30 controls the entire engine system 10. The ECU 30 is a computer including a ROM (Read Only Memory), a RAM (Random Access Memory), a CPU (Central Processing Unit), and the like which are not shown in the drawings. The ECU 30 is electrically connected to the throttle valve V and the EGR valve Va, or the above-described sensors.

The ECU 30 estimates the amount of the sulfuric compound accumulated on the DOC 20 and the DPF 21. Specifically, since the sulfuric compound accumulation amount is involved with the fuel amount consumed by the engine 11, the ECU 30 estimates the sulfuric compound accumulation amount based on the fuel consumption amount consumed by the engine 11. However, the sulfuric compound accumulation amount may be estimated by the other method. Further, the ECU 30 may store in advance the sulfur concentration in fuel used in a place where the engine system 10 is used and estimate the sulfuric compound accumulation amount in consideration of the sulfur concentration. Further, the sulfuric compound accumulation amount may be estimated in consideration of the sulfur concentration in fuel estimated based on the output values obtained from the SOx sensor 25 and the like. The ECU 30 is an example of an estimation unit that estimates the sulfuric compound accumulation amount of the exhaust gas control apparatus.

The ECU 30 detects the temperature, that is, the catalyst bed temperature of the exhaust gas control apparatus E based on the measurement values of the temperature sensors 26, 27, and 28. Furthermore, the temperature may be detected by directly installing the temperature sensors in the DOC 20 and the DPF 21. Each of the temperature sensors 26, 27, and 28 is an example of a detection unit that detects the temperature of the exhaust gas control apparatus. Furthermore, the catalyst bed temperature may be estimated from the operation state of the engine 11.

Figure 2A:
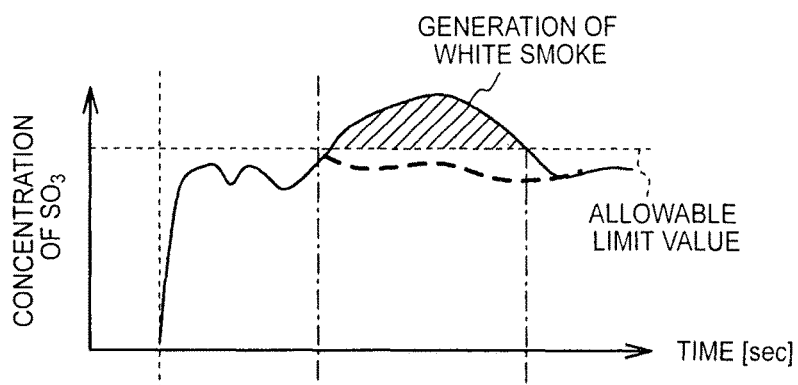
FIG. 2A is a graph illustrating the concentration of a sulfuric compound contained in an exhaust gas when white smoke is generated.

Next, a case will be described in which the exhaust gas is visibly recognized as white smoke. FIGS. 2A to 2D are graphs illustrating various values when white smoke is generated. The vertical axis of FIG. 2A indicates the concentration of the sulfuric compound contained in the exhaust gas. In FIG. 2A, the allowable limit value in which the exhaust gas is not visibly recognized as white smoke is indicated by the dotted line. The vertical axis of FIG. 2B indicates the engine rotation speed. The vertical axis of FIG. 2C indicates the intake air amount. The vertical axis of FIG. 2D indicates the catalyst bed temperature. The horizontal axes of FIGS. 2A to 2D indicate the elapse time.

Figure 2B:
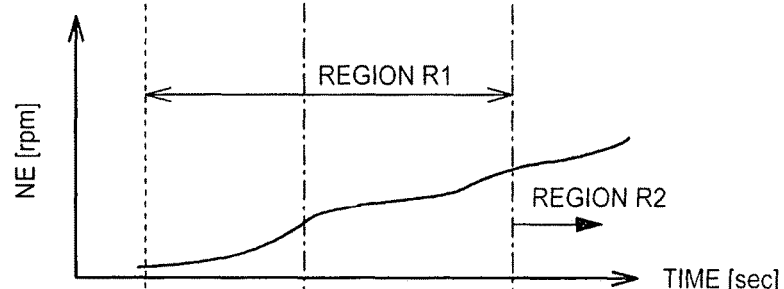
FIG. 2B is a graph illustrating an engine rotation speed when white smoke is generated.
Figure 2C:
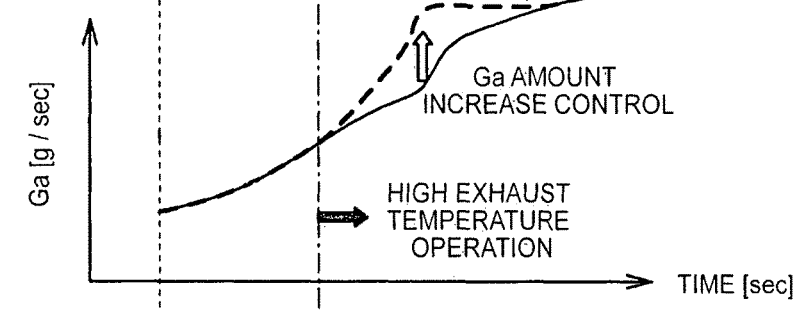
FIG. 2C is a graph illustrating an intake air amount when white smoke is generated.
Figure 2D:
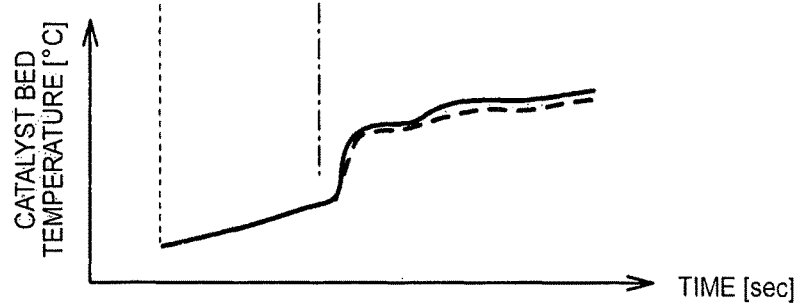
FIG. 2D is a graph illustrating a catalyst bed temperature when white smoke is generated.

A case will be supposed in which a certain degree of the sulfuric compound is accumulated on the DOC 20 and the DPF 21 and the rotation speed of the engine 11 gradually increases so that the catalyst bed temperature gradually increases. When the rotation speed of the engine 11 increases, the intake air amount increases, the operation state of the engine 11 belongs to a region R1 which will be described later, and the catalyst bed temperature increases as shown in FIGS. 2B to 2D, the sulfuric compound concentration in the exhaust gas becomes close to the allowable limit value as shown in FIG. 2A. When the catalyst bed temperature further increases as shown in FIG. 2D, the sulfuric compound concentration exceeds the allowable limit value so that the exhaust gas is visibly recognized as white smoke as shown in FIG. 2A. The reason is assumed that the amount of the sulfuric compound (SOx) separated from the DOC 20 and the DPF 21 increases when the catalyst bed temperature reaches a predetermined value or more and $SO_3$ in the exhaust gas is combined with $H_2O$ so as to become mist of $H_2SO_4$ and is discharged as white smoke. For example, such white smoke may be generated when the temperature of the exhaust gas increases in a case where the vehicle climbs a hill or when the temperature of the DOC 20 and the DPF 21 becomes a high temperature during the execution of a PM regeneration control.

Figure 3:
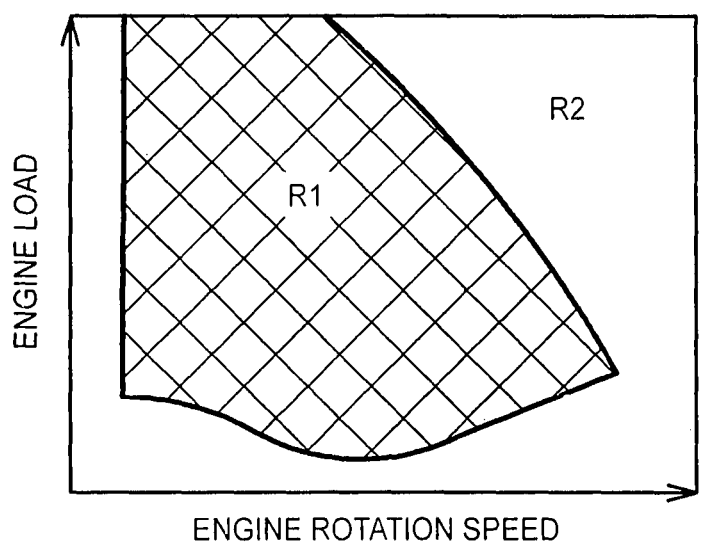
FIG. 3 is a map illustrating a region in which white smoke is visibly recognized and a region in which white smoke is not visibly recognized.

FIG. 3 is a map illustrating a region R1 in which white smoke is visibly recognized and a region R2 in which white smoke is not visibly recognized. In this map, the vertical axis indicates the load of the engine 11, and the horizontal axis indicates the rotation speed of the engine 11. This map is prepared in advance by an experiment or the like, and is stored in the ROM of the ECU 30. There is a case where the exhaust gas is not visibly recognized as white smoke even when the DOC 20 and the DPF 21 become hot while a predetermined value or more of the sulfuric compound is accumulated on the DOC 20 and the DPF 21 in accordance with the operation state of the engine 11.

For example, when the operation state belongs to the region R2 of which the engine rotation speed is higher than that of the region R1, the flow rate of the exhaust gas is fast. Accordingly, the sulfuric compound concentration in the exhaust gas also decreases, and hence white smoke is not easily and visibly recognized. Further, in this case, the vehicle speed is also fast in many cases, and hence white smoke is not easily and visibly recognized. In addition, when the operation state belongs to the region R2 of which the load is higher than that of the region R1, the fuel injection amount increases and the temperature of the exhaust gas becomes a high temperature. For this reason, it is considered that the moisture as one factor of the white smoke evaporates before the exhaust gas is discharged from the exhaust passageway 17 to the outside. Furthermore, when the operation state belongs to the region R2 of which the engine load or the rotation speed is lower than that of the region R1, the amount of the sulfuric compound separated from the DOC 20 is small due to the low temperature of the DOC 20. For this reason, white smoke is not easily and visibly recognized.

In the embodiment, the intake air amount is increased when the condition of visibly recognizing white smoke is satisfied so that white smoke is diluted. As a result, the white smoke is not easily and visibly recognized due to the dilution of the white smoke. In FIGS. 2A and 2C, the sulfuric compound concentration and the intake air amount obtained when the intake air amount increases are indicated by the dotted line.

Figure 4:
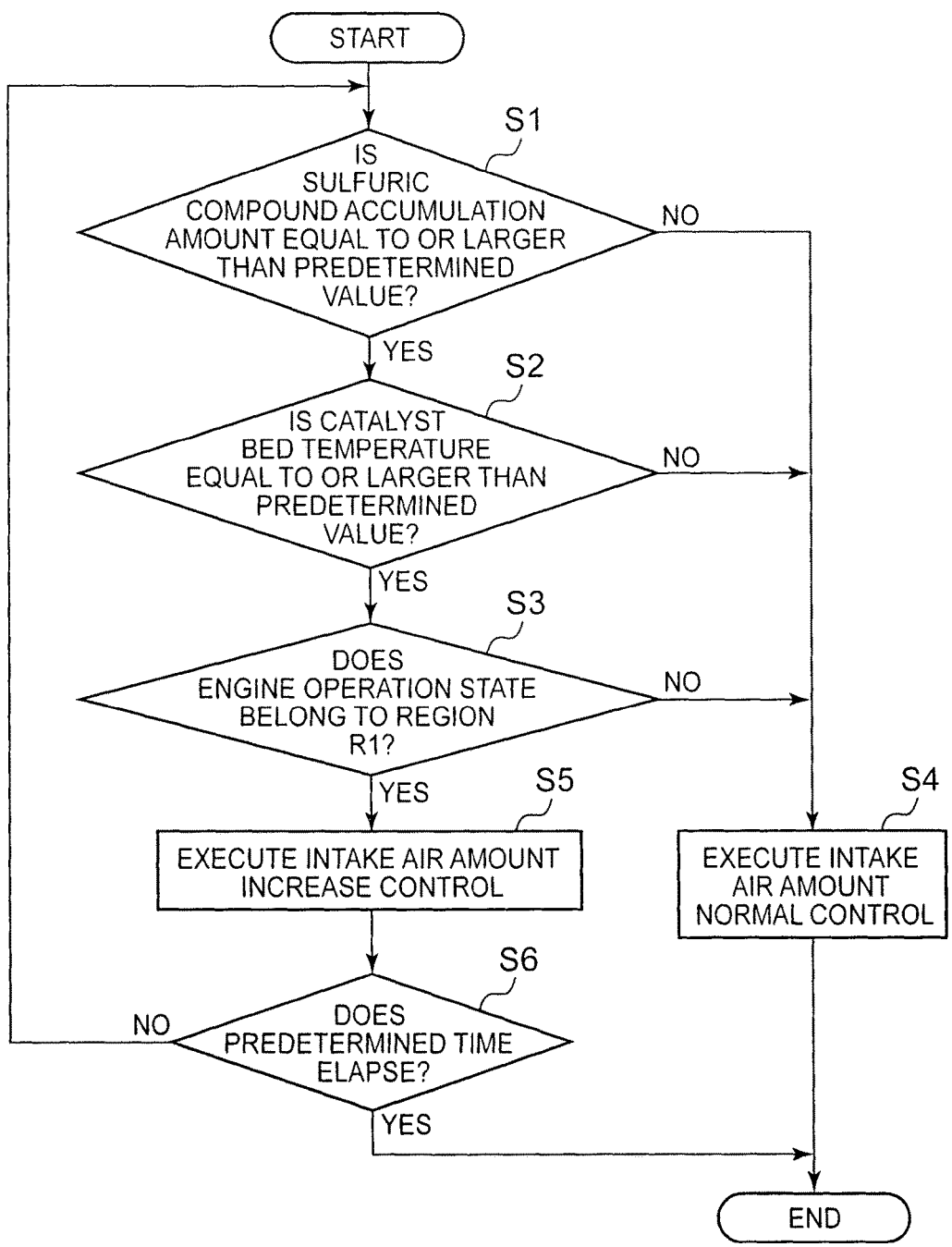
FIG. 4 is a flowchart illustrating an example of a control executed by an ECU.

FIG. 4 is a flowchart illustrating an example of a control executed by the ECU 30. The ECU 30 determines whether the sulfuric compound accumulation amount of the DOC 20 and the DPF 21 is equal to or larger than a predetermined value (step SI). The predetermined value is a value of the sulfuric compound accumulation amount of the DOC 20 and the DPF 21 when the exhaust gas is visibly recognized as white smoke due to the separation of the sulfuric compound accumulated on the DOC 20 and the DPF 21 in a case where the operation state of the engine 11 belongs to the region R1 and the temperature of the DOC 20 and the DPF 21 falls within a predetermined range.

When a positive determination is made in step S1, the ECU 30 determines whether the catalyst bed temperature is equal to or higher than a predetermined value (step S2). The predetermined value indicates a value of the catalyst bed temperature at which the exhaust gas starts to be visibly recognized as white smoke due to the separation of the sulfuric compound in a case where the operation state of the engine 11 belongs to the region R1 and the sulfuric compound accumulation amount of the DOC 20 and the DPF 21 is equal to or larger than the predetermined value.

The ECU 30 determines whether the operation state of the engine 11 belongs to the region R1 (step S3). Specifically, the ECU 30 recognizes the operation state of the engine based on the fuel injection amount and the rotation speed of the engine 11, and determines whether the operation state of the engine 11 belongs to the region R1 shown in the map of FIG. 3. Furthermore, the processes of step S1 to step S3 correspond to the processes used to determine whether the condition of generating white smoke is satisfied.

When a negative determination is made in any one of step S1 to step S3, the ECU 30 executes an intake air amount normal control (hereinafter, referred to as a normal control) (step S4). The normal control indicates a control of adjusting the opening degrees of the EGR valve Va or the throttle valve V so that the intake air amount reaches a target intake air amount corresponding to the requested operation state of the engine 11. White smoke is not generated when a negative determination is made in any one of step S1 and step S2 or white smoke is not easily and visibly recognized when a negative determination is made in step S3. For this reason, in this case, no problem arises even when the intake air amount is controlled by a normal method. The normal control is a control executed when the condition of generating white smoke is not satisfied. A series of the control ends after the normal control is executed.

A case where a positive determination is made in all step S1 to step S3 corresponds to a case where generated white smoke may be visibly recognized. In this case, the ECU 30 executes an intake air amount increase control (hereinafter, referred to as an amount increase control) (step S5). In the amount increase control, the intake air amount is made to become larger than the intake air amount set when the normal control is executed at the same operation condition as the operation state in the amount increase control. Specifically, the opening degree of the throttle valve V is set so that the throttle valve V is fully opened, and the opening degree of the EGR valve Va is set so that the EGR valve Va is fully closed. Thus, fresh air introduced into the engine 11 increases in amount, and the amount of the exhaust gas flowing back to the inlet of the engine 11 substantially becomes zero. Accordingly, the intake air amount increases as indicated by the dotted line of FIGS. 2A and 2C, and the exhaust gas amount also increases so that white smoke is diluted. As a result, the white gas is not easily and visibly recognized due to the dilution of the white gas. The throttle valve V and the EGR valve Va are examples of an intake air amount adjuster that adjusts the intake air amount.

Next, the ECU 30 determines whether the amount increase control execution period elapses by a predetermined period (step S6). Here, the predetermined period is a period which is sufficiently set so that the sulfuric compound accumulated on the DOC 20 and the DPF 21 is entirely separated. When a positive determination is made in step S6, the control ends. When the control ends, the sulfuric compound accumulation amount of the DOC 20 and the DPF 21 is reset to zero. In the process of step S1 when the control is executed again, the sulfuric compound accumulation amount is estimated based on the fuel consumption amount after the accumulation amount is reset.

When a negative determination is made in step S6, the ECU 30 executes a process after step S1. Furthermore, in this case, in the process of step S1 in which the control is executed again, the ECU 30 estimates the current sulfuric compound accumulation amount in consideration of the sulfuric compound separated from the DOC 20 and the DPF 21 during an actual period of an amount increase control.

As described above, it is possible to suppress a problem in which a user who visibly recognizes white smoke feels uncomfortable by executing the amount increase control when the condition of generating white smoke is satisfied. Further, it is possible to suppress an influence on the drivability by executing the normal control when the condition is not satisfied.

Furthermore, the amount increase control is not limited to the control in which the throttle valve V is adjusted to be fully opened and the EGR valve Va is adjusted to be fully closed. For example, the opening degree of the throttle valve V in the amount increase control may be controlled to the opening side compared to the opening degree of the throttle valve V set in the normal control in the same operation state as the amount increase control. Similarly, the opening degree of the EGR valve Va in the amount increase control may be controlled to the closing side compared to the opening degree of the EGR valve Va set in the normal control in the same operation state as the amount increase control. Even in this case, the intake air amount may be increased compared to the normal control.

In the amount increase control, only the opening degree of the throttle valve V may be controlled to the opening side compared to the normal control, and the opening degree of the EGR valve Va may be continuously subjected to the normal control. Further, only the opening degree of the EGR valve Va may be controlled to the closing side compared to the normal control, and the opening degree of the throttle valve V may be continuously subjected to the normal control in the engine 11.

The opening degree of the variable nozzle vane 18a in the amount increase control may be controlled to the closing side compared to the opening degree of the variable nozzle vane 18a set in the normal control in the same operation state as the amount increase control. Thus, the supercharging pressure decreases, and hence the intake air amount with respect to the engine 11 may be increased. Accordingly, the amount increase control may be at least one of the control of controlling the throttle valve V to the opening side, the control of controlling the EGR valve Va to the closing side, and the control of controlling the variable nozzle vane 18a to the closing side.

The amount increase control may be executed in synchronization with an increase in the temperature of the DPF 21 during the execution of the PM regeneration control of burning the PM accumulated on the DPF 21 by igniting the fuel added from the fuel adding valve 24 to the exhaust gas.

The correction may be performed so that the amount increase control execution period increases as the sulfur concentration of fuel increases. Further, the correction may be performed so that the intake air amount increases as the sulfur concentration of fuel increases. In general, as the sulfur concentration of fuel increases, the white smoke discharge period increases and the sulfur concentration in the exhaust gas increases so that the white smoke is easily and visibly recognized. Further, the region R1 may be widened as the sulfur concentration of fuel increases.

Furthermore, the temperature of the DOC 20 and the DPF 21 may be slightly decreased by increasing the intake air amount. Even in this configuration, it is possible to prevent a problem in which a user may easily and visibly recognize white smoke by suppressing the separation of the sulfuric compound from the DOC 20 and the DPF 21 and the generation of white smoke.

The above-described embodiment is merely an example of implementing the invention, and the invention is not limited thereto. For the description above, it is apparent that various modifications of the embodiment are included in the scope of the invention and various embodiments may be employed in the scope of the invention.

The invention claimed is:

1. A control apparatus for an internal combustion engine, the internal combustion engine including an exhaust gas control apparatus provided in an exhaust system of the internal combustion engine, and the internal combustion engine including an intake air amount adjuster configured to adjust an intake air amount of the internal combustion engine, the control apparatus for the internal combustion engine comprising:
   a temperature sensor configured to detect the temperature of the exhaust gas control apparatus;
   an electronic control unit; and
   a non-transitory computer-readable medium encoded with executable instructions, which when executed by the electronic control unit, cause the electronic control unit to:
   (a) estimate a sulfuric compound accumulation amount based on at least one of an amount of fuel consumed by the engine, a sulfur concentration in the fuel detected by a fuel property sensor or stored in memory for fuel used in a location where the engine is being used, or a sulfur concentration in exhaust gas detected by a SOx sensor, the sulfuric compound accumulation amount being an amount of a sulfuric compound accumulated on the exhaust gas control apparatus; and
   (b) when a set of conditions including the sulfuric compound accumulation amount being equal to or larger than a predetermined accumulation amount and the temperature of the exhaust gas control apparatus being equal to or higher than a predetermined temperature is satisfied in an operation state of the internal combustion engine that falls within a predetermined region of engine load and engine rotation speed in which exhaust gas from the internal combustion engine is visibly recognized as white smoke, control the intake air amount adjuster such that the intake air amount adjuster increases the intake air amount as compared to when the set of conditions is not satisfied in the operation state of the internal combustion engine.

2. The control apparatus according to claim 1, wherein the non-transitory computer-readable medium is further encoded with executable instructions, which when executed by the electronic control unit, further cause the electronic control unit to, when the set of conditions is satisfied and the operation state of the internal combustion engine falls within the predetermined region, control the intake air amount adjuster such that the intake air amount adjuster increases an intake air amount as compared to when the set of conditions is satisfied and the operation state of the internal combustion engine is in a high engine load side region or a high engine rotation speed side region compared to the predetermined region.

3. The control apparatus according to claim 1, wherein the intake air amount adjuster is a throttle valve, and the non-transitory computer-readable medium is encoded with executable instructions, which when executed by the electronic control unit, cause the electronic control unit to control the throttle valve to an opening side so as to increase the intake air amount.

4. The control apparatus according to claim 1, wherein the intake air amount adjuster is an exhaust gas recirculation valve, and the non-transitory computer-readable medium is encoded with executable instructions, which when executed by the electronic control unit, cause the electronic control unit to control the exhaust gas recirculation valve to a closing side so as to increase the intake air amount.

5. The control apparatus according to claim 1, wherein the intake air amount adjuster is a variable nozzle vane of an exhaust turbine of a turbocharger, and the non-transitory computer-readable medium is encoded with executable instructions, which when executed by the electronic control unit, cause the electronic control unit to control the variable nozzle vane to a closing side so as to increase the intake air amount.

* * * * *